United States Patent
Abusch-Magder et al.

(10) Patent No.: US 7,639,988 B2
(45) Date of Patent: Dec. 29, 2009

(54) METHODS OF SIMPLIFYING NETWORK SIMULATION

(75) Inventors: David Abusch-Magder, Maplewood, NJ (US); Jeffrey Brian Arnold, Great Falls, VA (US); Robert Kang-Xing Jin, Frederick, MD (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 381 days.

(21) Appl. No.: 11/072,439

(22) Filed: Mar. 7, 2005

(65) Prior Publication Data

US 2006/0199545 A1    Sep. 7, 2006

(51) Int. Cl.
*H04B 17/00*  (2006.01)
*H04W 4/00*   (2006.01)
*H04W 40/00*  (2006.01)

(52) U.S. Cl. .................. 455/67.11; 455/446; 455/422.1; 455/423

(58) Field of Classification Search .............. 455/67.11, 455/466, 423, 425, 453, 446, 67.14, 422.1
See application file for complete search history.

(56) References Cited

U.S. PATENT DOCUMENTS

| 6,094,580 | A   | * | 7/2000  | Yu et al.       | 455/446   |
|-----------|-----|---|---------|-----------------|-----------|
| 6,560,459 | B1  | * | 5/2003  | Wong            | 455/447   |
| 7,136,638 | B2  | * | 11/2006 | Wacker et al.   | 455/424   |
| 2002/0009992 | A1 | * | 1/2002  | Jensen         | 455/422   |
| 2006/0073791 | A1 | * | 4/2006  | Senarath et al.| 455/67.13 |
| 2007/0042778 | A1 | * | 2/2007  | Keller et al.  | 455/443   |

* cited by examiner

*Primary Examiner*—Eugene Yun
(74) *Attorney, Agent, or Firm*—Harness, Dickey & Pierce, P.L.C.

(57) ABSTRACT

In a method of simplifying simulation of a wireless communication network, the network may be divided into one or more neighborhoods. A neighborhood may be represented by a given cell to be evaluated and possibly one or more neighbor cells of the given cell. A desired simulation of one or more of the neighborhoods may be implemented in order to evaluate network performance. The neighborhood may be determined as a function of reverse link interference information, path loss information, or on a geographic distance between cells.

22 Claims, 7 Drawing Sheets

METHODS OF SIMPLIFYING NETWORK SIMULATION

BACKGROUND OF THE INVENTION

1. Field of the Invention

The present invention relates generally to methods of simplifying simulation of wireless communication networks.

2. Description of the Related Art

Wireless network design and optimization algorithms typically perform numerous network simulations to evaluate potential system configurations. Although network simulators may have varying characteristics, one constant is that simulation runtime generally increases monotonically (and frequently non-linearly) with the number of cells in a network that are to be evaluated. In other words, simulation runtime generally increases as the number of cells to be evaluated increase.

For example, consider a network simulator that, based on traffic data, computes network coverage by placing sample mobiles throughout a given network and determining each cell's effect on each mobile and vice-versa (e.g. each mobile's effect on each cell). A single network evaluation using this method would take $O(MN)$ time, where M is the number of mobiles to be examined and N is the number of cells. Given capacity constraints, M is proportional to N, and the runtime of a single simulation is $O(N^2)$. Due to this $O(N^2)$ growth, a network evaluation can become computationally expensive as the number of cells to be evaluated in the network increase. Performing a plurality of independent large-scale network evaluations, as is typically required for conventional wireless communication network optimization and design, has thus become increasingly undesirable.

SUMMARY OF THE INVENTION

An exemplary embodiment of the present invention is directed to a method of simplifying simulation of a wireless communication network. In the method, the network may be divided into one or more neighborhoods. A neighborhood may be represented by a given cell to be evaluated and one or more neighbor cells of the given cell. A desired simulation of one or more of the neighborhoods may be implemented in order to evaluate network performance.

Another exemplary embodiment of the present invention is directed to a method of accelerating the computational processing of an optimization algorithm used for evaluation of a wireless communication network. The method may include dividing the network into one or more neighborhoods. A neighborhood may be represented by a given cell to be evaluated and one or more neighbor cells of the given cell. A desired optimization algorithm may then be invoked using one or more of the neighborhoods for evaluating network performance, thus reducing the computational complexities of the optimization by reducing the number of cells to be evaluated in a given evaluation of the network or iteration of the optimization algorithm.

Another exemplary embodiment of the present invention is directed to a method of determining a neighborhood around a specified cell within a wireless communication network. The neighborhood may then be evaluated in place of the full network evaluation. Reverse link interference values may be measured at the selected cell for mobiles owned or in communication with another cell. The other cell may or may not be part of the neighborhood that is determined. Each reverse link interference value may be compared to a threshold, and those cells whose mobiles contribute reverse link interference that exceeds the threshold may be selected as members of the neighborhood around the given cell to be evaluated.

Another exemplary embodiment of the present invention is directed to a method of determining a neighborhood around a specified cell within a wireless communication network. The neighborhood may be evaluated in place of the full network evaluation. The neighborhood including the given cell may be defined based on a threshold relating to the geographical distance of other cells from the given cell.

Another exemplary embodiment of the present invention is directed to a method of determining a neighborhood around a specified cell within a wireless communication network. The neighborhood may be evaluated in place of the full network evaluation. The neighborhood including the given cell may be defined based on a threshold relating measured path loss values at the given cell from one or more other cells.

Another exemplary embodiment of the present invention is directed to a method of assessing quality of a neighborhood of cells determined for a cell of interest. The neighborhood may represent a subset of an entire network, with the neighborhood and the entire network subject to evaluation. In the method, one of a simulation and a measurement may be performed using the determined neighborhood to determine a first parameter. A second parameter may be determined by performing one of a simulation and a measurement of the entire network. Based on the determined first and second parameters, a correlation coefficient between the neighborhood and entire network may be determined. The value of the correlation coefficient may be indicative of the quality of the neighborhood, as used for the simulation or measurement, as compared to the entire network.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus are not limitative of the exemplary embodiments of the present invention.

DETAILED DESCRIPTION OF THE EXEMPLARY EMBODIMENTS

Figure 1:
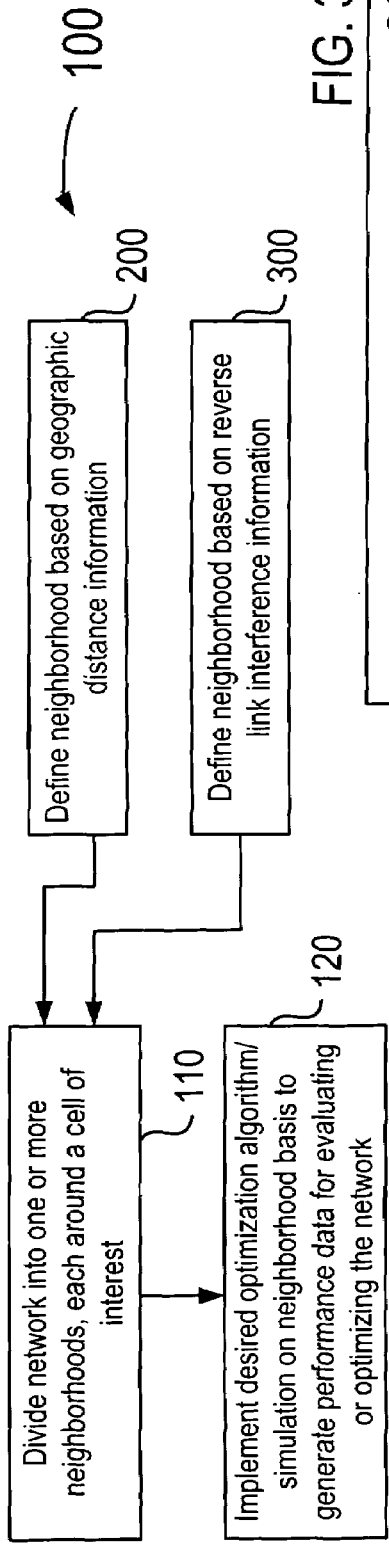
FIG. 1 is a flowchart for describing a method of simplifying simulation of a wireless communication network, in accordance with an exemplary embodiment of the present invention.

Although the following description relates to a network based on one or more of CDMA (IS95, cdma2000 and various technology variations), UMTS, GSM, 802.11 and/or related technologies, and will be described in this exemplary context, it should be noted that the exemplary embodiments shown and described herein are meant to be illustrative only and not limiting in any way. As such, various modifications will be apparent to those skilled in the art for application to communication systems or networks based on technologies other than the above, which may be in various stages of development and intended for future replacement of, or use with, the above networks or systems.

The exemplary embodiments of the present invention are directed to methods of network simulation and/or evaluation simplification. The simplification(s) described hereafter may reduce the computational complexities of optimization algorithms used for large-scale network simulations/evaluations having slightly differing configurations. As will be described below, and in general, one may be able to leverage the local nature of wireless radio propagation in order to reduce the number of cells and mobiles to be considered in each network evaluation. A motivation behind this locality property or approach may be understood as follows: cells located "far enough" apart should exert negligible effects on each other. For example, cells on opposite sides of a large metropolitan area should have little effect on each other.

This locality property may be exploited in an effort to achieve significant performance gains even within moderately sized markets. Instead of performing numerous full-network simulations, one can instead simulate much smaller "neighborhoods" around cells of interest. By using the simplification described herein, each successive network evaluation may be completed in O(S) time, where S is a structural constant of the network that is related to neighborhood size and is independent of M and N. This approach may thus be used to reduce the asymptotic runtime of algorithms based in network simulation by a factor of $N^2$. Although the runtime calculations and data presented hereafter in the simulated examples are based on a specific network simulator, the proposed approach may be generic since it is based on properties common to all wireless networks.

To provide context for the exemplary embodiments described herein, the inventors provide an overview of a particular network optimization problem, generally discuss algorithms that may be used to demonstrate the locality simplifications, and provide an introduction to distance measures.

Cell Site Selection and Cell Deletion

Cell deletion, a variant of the well-known cell site selection problem, is an example of a computationally difficult wireless optimization problem whose solution generally requires numerous conventional large-scale network simulations. Cell deletion asks how the designer should remove k cells from a network while maximizing a network performance measure such as network coverage. This problem is relevant in planning network upgrades, when new technologies often improve network performance so that fewer cells are needed to achieve previous performance levels.

The size of the solution space for optimization and the complicated behavior of realistic network performance functions make producing an exact solution for the cell deletion problem nearly impossible. In fact, if no restrictions are placed on the behavior of the network performance function, then an optimal solution to cell deletion can not be found without evaluating all possible solutions.

Since finding exact solutions to discrete optimization problems such as cell deletion is computationally intractable for all but the smallest markets, recent work on such problems has focused on heuristic techniques. Heuristics such as greedy and simulated annealing algorithms attempt to produce near-optimal solutions to the optimization problem in a reasonable or desired amount of time. Both heuristic algorithms have been applied to cell deletion.

Cell Deletion with Greedy and Simulated Annealing

Greedy and simulated annealing are two different heuristics that can be used to approach cell deletion. Implementation of the greedy algorithm removes k cells from a network by iterating k times, each time removing from the network the "least valuable" remaining cell. In order to identify this cell, the algorithm simulates the network removing each cell that is a deletion candidate. The change in performance caused by the removal of each candidate is calculated, and the deletion candidate that would lead to the smallest reduction in network performance is considered to be the least valuable. This least valuable cell is then removed.

The simulated annealing algorithm is inspired from analogy of annealing. Annealing is a physical process in which a low energy molecular configuration is determined by allowing a material to cool slowly. In both simulated annealing and its analog, annealing, the starting configuration may be much higher in energy, and through molecular motion the material seeks, and is able to find, a lower energy state.

The success of annealing may depend on the ability to move through higher energy molecular configurations. Factors affecting such excursions may be the energy available, which is generally measured by the temperature of the material. As the temperature is lowered, such excursions become less likely and the material settles into a lower energy state.

For an implementation of cell deletion using a simulated annealing algorithm, the algorithm may be initiated by generating a random network configuration with k cells removed. The algorithm proceeds by performing a "cell swap" in which one disabled cell is enabled and one enabled cell is disabled. If the swap improves the performance of the network, the algorithm keeps (stores) the new configuration and proceeds with the new configuration. If the swap degrades the performance of the network, the algorithm randomly decides whether to keep the new configuration, or to reject the swap and revert to the previous configuration.

This decision is based in part on the performance difference involved and on the current "temperature" of the simulation. Just as in physical annealing, in the simulating annealing algorithm the temperature decreases with time, such that the probability of keeping an unfavorable swap decreases with time. The simulated annealing algorithm may terminate after a given number of iterations (which may be set in advance), and the current state at the end of the final iteration is declared its solution. The number of full network evaluations required by simulated annealing is the same as the number of iterations for which the algorithm is run.

Distance Measures

The effectiveness of any locality-based network optimization may be influenced by the definition of "distance" between cells. It is this notion of distance that permits a neighborhood to be defined around each cell. Generally, a distance measure may be understood as a function that "measures" the "distance" between two cells. The distance need not be a simple measure of the geographic separation, but rather may be a generalization that should capture how much cells affect each other. A desirable distance measure would conclude that cells having a relatively large effect on each other are closer.

The geographic distance between two cells may be the simplest measure of distance. While cells that are geographically farther apart will tend to have less effect on each other using this distance measure, simple geographic distance does not incorporate the fundamental interaction between cells—radio frequency radiation.

Radio frequency effects should thus be accounted for in order to accurately measure the distance between cells. The path loss (i.e., a measure of an attenuation signal between two points) at broadcast frequencies may serve as a desired measure of distance to determine a given neighborhood for a cell of interest, for example. The path loss may be measured between the cell of interest and one or more points in the vicinity of another cell. For example, the path loss may be measured by comparing the power received from another cell by the cell of interest to the power broadcast by the another cell. In another example, the path loss may be measured by comparing the power received from the cell of interest at mobiles owned by another cell. In a further example, the path loss may be computed by measuring power from the cell of interest at points in the vicinity of another cell. The points may or may not be the mobiles owned by the other cell. In another example, a plurality of measurements can be combined into a single valued measure to be evaluated against the threshold.

Cells that have greater path loss from the cell of interest would be considered "farther", regardless of the geographic distance between cells. A neighborhood may then be defined as those cells that have a path loss value below some threshold (which may be set in advance or be based on another criterion) from the cell of interest, while those cells with path loss value greater than the threshold would not be included in the neighborhood. A path loss-based distance measure would thus incorporate the local terrain, the clutter, and the propagation environment.

However, given the frequency division duplexing used to separate the forward and reverse links in cellular systems, it is not the forward link broadcast of one cell that interferes with another cell, but rather the interference on the reverse link. Accordingly, a modified distance measure that incorporates the deleterious reverse link interference may be desirable when assessing inter-cell interaction. By measuring the power of the reverse link interference at cell of interest A due to the mobiles in communication with another cell B, a distance measure between the two cells may thus be defined. This measure, like the reverse interference, may be dependent on the number of mobiles owned by cell B. By "owned", the cell (i.e., cell B) that is serving the mobile(s) may represent the mobiles' primary radio connection. Alternatively, any mobiles which may be in communication with a given cell (such as cell B in this example), could also represent mobiles that may be owned by cell B.

This "distance" measure, like reverse link interference, is not symmetric; the mobiles served and/or owned by cell A may have a larger effect on cell B than the effect of those mobiles served by cell B have on cell A. Yet, a distance measure based on a reverse link interference definition may be applicable to a variety of different air interfaces, and may naturally incorporate the differing interactions between cells inherent in each technology.

Network optimization problems, optimization algorithms and distance measures having been briefly discussed, methods of simplifying network simulation and/or methods to reduce the computational complexities of optimization algorithms used for large-scale network evaluations are described hereafter.

FIG. 1 is a flowchart for describing a method 100 of simplifying simulation of a wireless communication network in accordance with an exemplary embodiment of the present invention. In general, for a given network that is to be evaluated (such as by simulation) the network may be divided into one or more neighborhoods (110). A neighborhood may be represented by a given cell to be evaluated (i.e., cell of interest) and one or more "neighbor" cells of the given cell. In some constructions, a neighborhood could include only the cell of interest, i.e., some cells of interest may be determined as having no neighbors. A desired simulation of one or more of the neighborhoods may be implemented (120) in order to evaluate network performance. The results of this evaluation may then be used to perform the optimization algorithm. Accordingly, evaluation may be done on a neighborhood-by-neighborhood basis, instead of on the network as a whole.

As an example of a simulation and optimization algorithm, the implementing function 120 may be embodied by iterating a greedy heuristic-based algorithm using one or more of the neighborhoods to optimize network performance. Alternatively, the implementing function 120 may be embodied by iterating a simulated annealing-based algorithm using one or more of the neighborhoods to determine network performance. These exemplary optimization algorithms will be described in further detail hereafter.

As shown in FIG. 1, a given neighborhood may be determined using several possible thresholding techniques. As will be described in further detail hereafter, in one exemplary embodiment, defining a neighborhood including a given cell to be evaluated may be determined based on a geographic distance information from the cell of interest. Alternatively, reverse link information of those mobiles owned by the cell to be evaluated (300) may be used to determine the neighborhood to be subject to simulation/optimization.

Neighborhoods

To take advantage of locality, one needs to define the "neighbors" of every cell of interest. When performing a network simulation around cell A, one only needs to consider the cells that are close enough to A to be relevant. Several methods can be used to determine what distance corresponds to this "close enough" threshold. In an example, two thresholding mechanisms for determining neighborhoods are described to illustrate the potential variation created by the threshold selection.

As shown in FIG. 1, a given neighborhood may be determined using several possible thresholding techniques. As will be described in further detail hereafter, in one exemplary embodiment, defining a neighborhood including a given cell to be evaluated may be determined based on a geographic distance information from the cell of interest. Alternatively, reverse link information of those mobiles owned by the cell to be evaluated (300) may be used to determine the neighborhood to be subject to simulation/optimization.

To take advantage of locality, one needs to define the "neighbors" of every cell of interest. When performing a network simulation around cell A, one only needs to consider the cells that are close enough to A to be relevant. Several methods can be used to determine what distance corresponds to this "close enough" threshold. In an example, two thresholding mechanisms for determining neighborhoods are described to illustrate the potential variation created by the threshold selection.

Figure 2:
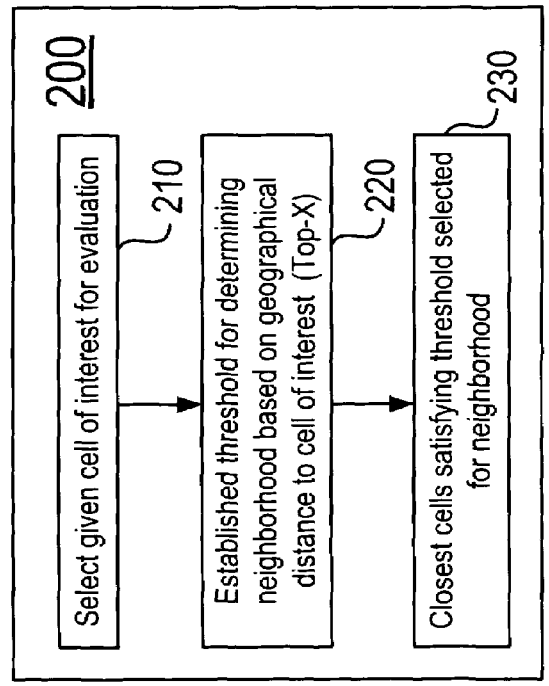
FIG. 2 is a flowchart for describing geographic distance or "top-X" thresholding for determining a neighborhood, in accordance with an exemplary embodiment of the present invention.

FIG. 2 is a flowchart for describing geographic distance or "Top-X" thresholding (200) for determining a neighborhood, in accordance with an exemplary embodiment of the present invention. As shown in FIG. 2, a given cell in the network may be selected (210) for evaluation. In order to determine the neighborhood surrounding the selected cell, a threshold is established for the neighborhood based on the geographic distance to the cell of interest, or "Top-X" (220).

Figure 3:
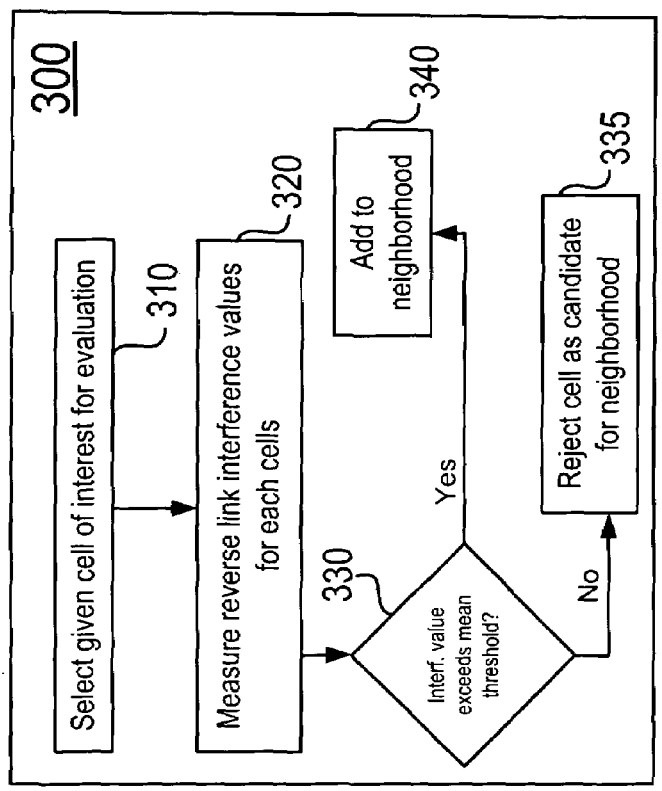
FIG. 3 is a flowchart for describing reverse link interference thresholding for determining a neighborhood, in accordance with an exemplary embodiment of the present invention.

FIG. 3 is a flowchart for describing reverse link interference thresholding (300) for determining a neighborhood, in accordance with an exemplary embodiment of the present invention. Thresholding cells based on reverse link interference information may provide a neighborhood that is not restricted to the closest geographic cells.

Accordingly, as discussed above, one method of determining the neighbors of a cell is to select the "top-X" closest cells as neighbors, where X is a pre-selected constant based on the structure of the network. But this "geographic distance Top-X" thresholding methodology is not the only thresholding technique for neighborhood cell determination. For example, network inhomogeneity may make it desirable to have different neighborhood sizes for different cells. A cell in a dense, high-interference area should have more neighbors than a cell in a sparse area, for example.

FIG. 3 is a flowchart for describing reverse link interference thresholding (300) for determining a neighborhood, in accordance with an exemplary embodiment of the present invention. Thresholding cells based on reverse link interference information may provide a neighborhood that is not restricted to the closest geographic cells.

Figure 4:
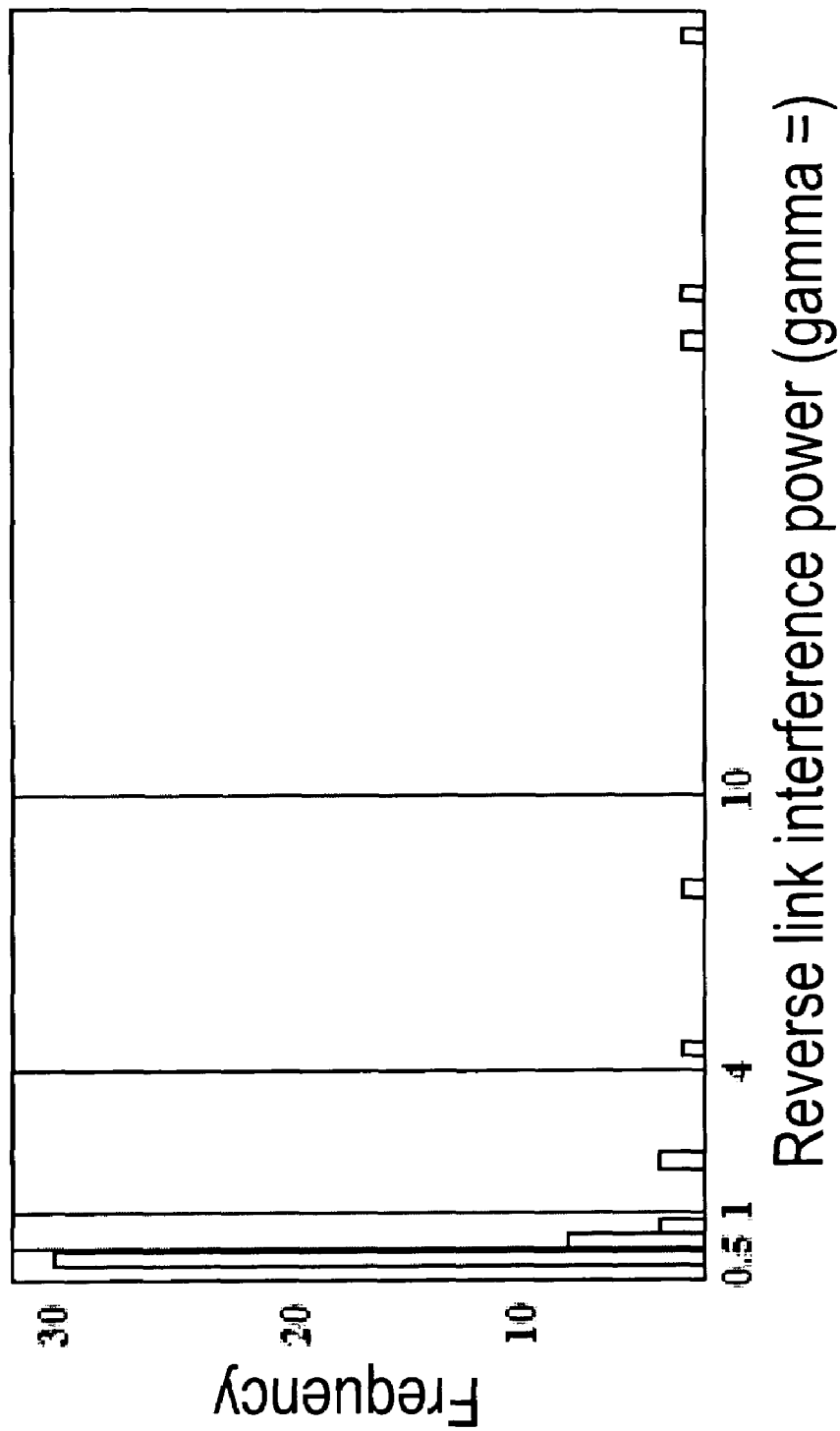
FIG. 4 is a histogram of interference power for a sample cell.

FIG. 4 is a histogram of interference power for a sample cell. The distribution of reverse link interference power (shown on a linear scale) is highly right-skewed. In other words, each cell in a network is only significantly interfered with by a small number of other cells in the network. This inherent property of wireless networks may enable neighborhoods around cells to be determined by simply thresholding interference power by some multiple .gamma. of the mean interference, and defining the neighbors as those cells with interference greater than the threshold. In the histogram, thresholds for .gamma.=0.5, 1, 4 and 10 are marked on the x-axis—a greater .gamma. results in fewer neighbors.

The reverse link interference power distribution for cells is heavily right-skewed, demonstrating that most of the interference at any cell is due to a relatively small number of other cells. By choosing an appropriate interference cut-off value and selecting all cells with interference scores greater than that value, one may thus obtain interference-based neighborhoods that are essentially independent of the total size of the network. Accordingly, determining cells for a neighborhood based on some multiple .gamma. of the linear mean of interference power for each cell may be a desirable alternative to "Top-X" thresholding. Greater values of .gamma. will result in smaller neighborhoods. A cell-specific mean interference value is used instead of a global mean interference value because cells are often in significantly different interference environments.

Figure 5:
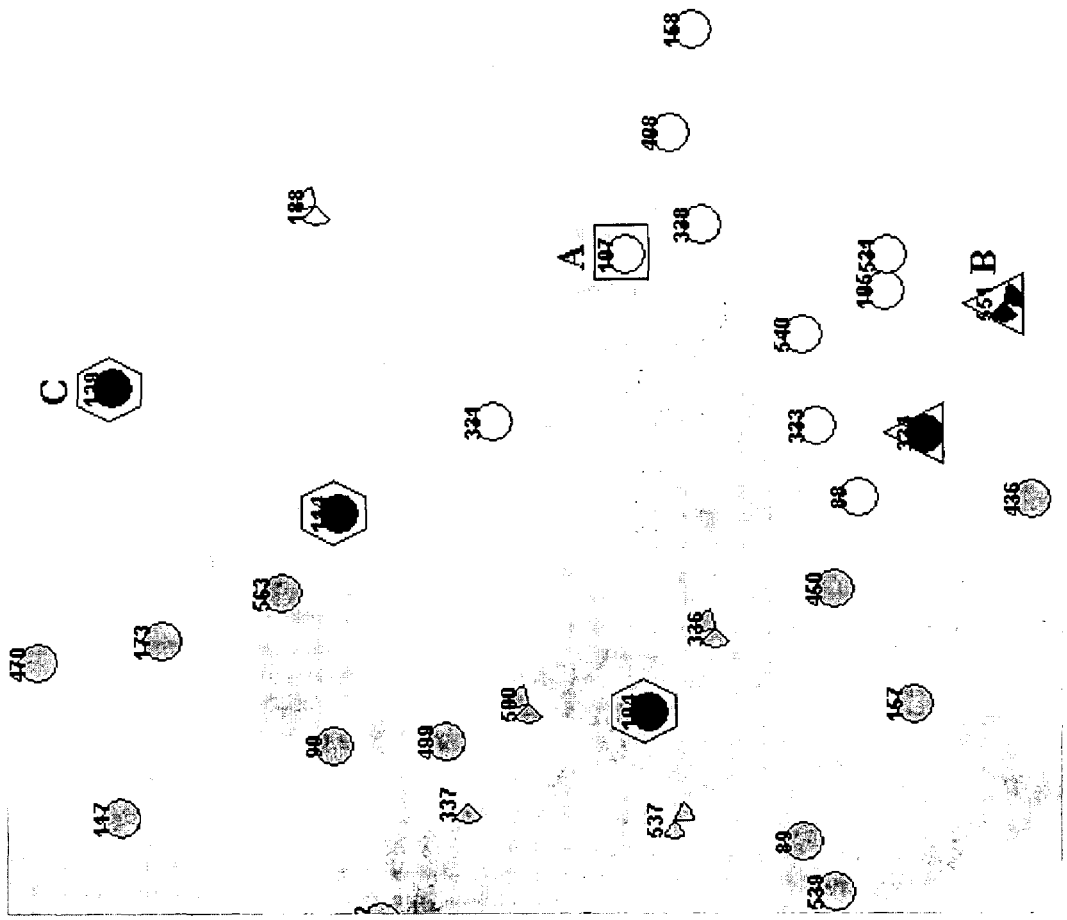
FIG. 5 is a topographic map to illustrate a comparison of Neighborhoods determined by Interference Mean and Geographic Distance Top-X thresholding techniques.

FIG. 5 is a topographic map to illustrate a comparison of neighborhoods determined by Interference Mean and Geographic Distance Top-X thresholding techniques. FIG. 5 illustrates a section of a realistic network with topography indicated in grayscale. The cell of interest is labeled A and enclosed within a square. "Neighboring" cells chosen by both of the thresholding techniques (interference mean and geographic distance top-X) are shown in white (i.e., clear, white cells). In FIG. 5, a neighborhood size of 13 is illustrated for interference mean thresholding, and a size of 14 is shown for geographic distance top-X. Cells chosen exclusively by interference mean thresholding are shown as solid elements within a hexagon, and cells chosen exclusively by geographic distance top-X are solid and enclosed within a triangle.

The modification to make the greedy algorithm work with neighborhoods are relatively straightforward. The change is that simulations to determine the performance penalty for disabling a cell should no longer be performed on the entire network. Instead, each cell's performance penalty calculation should be performed within its own neighborhood. This is shown in the comparison between the conventional-greedy and modified locality-greedy penalty calculations below in Expression (1).

Conventional-greedy:

Penalty$_A$=Performance of network with cell $A$ on–Performance of network with cell $A$ off;

Locality-greedy:

Penalty$_A$=Performance of $A$'s neighborhood with cell $A$ on–Performance of $A$'s neighborhood with cell $A$ off. (1)

Locality-greedy requires approximately twice the number of partial network evaluations as conventional-greedy requires full network evaluations. But, while the total number of evaluations may increase, each evaluation is simpler because only the neighborhood of the cell—and not the entirety of the network, is considered. Locality-greedy thus requires $O(2S^2)$ time for each step that conventional-greedy performs in $O(MN)$ time, where S is the neighborhood size. This difference implies that conventional-greedy may be more favorable for sufficiently small networks ($MN/2S^2 \approx 1$) while locality-greedy may be preferable for medium-to-large networks ($MN/2S^2 \gg 1$).

Conventional-simulated-annealing may be modified a bit differently than conventional-greedy in order to take advantage of locality. Conventional-simulated-annealing normally determines the performance "gain" (either positive or negative) of a particular cell swap by finding the performance difference of the entire network between the "before" and "after" configurations. This is shown in Expression (2).

Conventional-simulated-annealing:

Performance gain=Performance of network after–Performance of network before. (2)

Since a cell swap only directly affects the state of two cells, A and B, the network only need be re-simulated within the neighborhoods of these two cells. If A is the cell that is being enabled by the swap and B is the one that is being disabled, then the net performance gain may be calculated as shown in Expression (3) below.

Locality-simulated-annealing:

Performance gain=Performance gain of $A$'s neighborhood—Performance gain of $B$'s neighborhood (3)

Accordingly, Expression (3) may be understood as the performance gain when cell A and B are swapped. This is computed based on the difference between the performance of A's neighborhood with A turned on and the performance of A's neighborhood with A turned off (called Performance gain of A's neighborhood in Expression (3)) and similarly on the difference between the performance of B's neighborhood with B turned off and the performance of B's neighborhood with B turned on (called Performance gain of B's neighborhood in Expression (3)).

Locality-simulated-annealing requires four times as many partial network evaluations as conventional-simulated-annealing requires full network evaluations. Locality-simulated-annealing thus requires $O(4S^2)$ time for each step that conventional-simulated-annealing performs in $O(MN)$ time, where S is the neighborhood size.

SIMULATED EXAMPLES

To test the performance of the methods described above, several simulations were performed. Coverage is evaluated in both the forward and reverse link, including both pilot ($E_c/I_0$) and traffic channel ($E_b/N_0$) requirements. Since a pre-existing network was assumed to exist (as in a network upgrade), the cell sites are considered to be fixed; thus the possibility of acquiring additional sites was not considered. The simulations presented hereafter used typical cdma2000-1X (also known as 3G-1X) voice parameters, with the understanding that the exemplary approach is general and can be applied to other technologies (UMTS, IS-95, etc.) and to other services (such as high speed data).

Locality Simplification Allows For Accurate Simulation

Neighborhood simplifications were applied to both greedy and simulated annealing algorithms used for solving the cell deletion problem on multiple wireless networks, including α-irregular networks and realistic networks. An α-irregular network is constructed from a uniform-traffic network with omni-directional cells of mean separation $r_s$ in a uniform hexagonal array using flat terrain. Each cell is then offset from its position in the uniform array by a random offset; the probability distribution of that offset is uniform in all directions and in magnitude between 0 and $\alpha r_s$. The resulting realization of an α-irregular networkserves as a model network which incorporates some irregularity into the cell positions. The simulation results demonstrate that neighborhood simplification may allow for accurate simulation with significant efficiency gains for both the greedy and simulated annealing approaches to cell deletion.

Figure 6A:
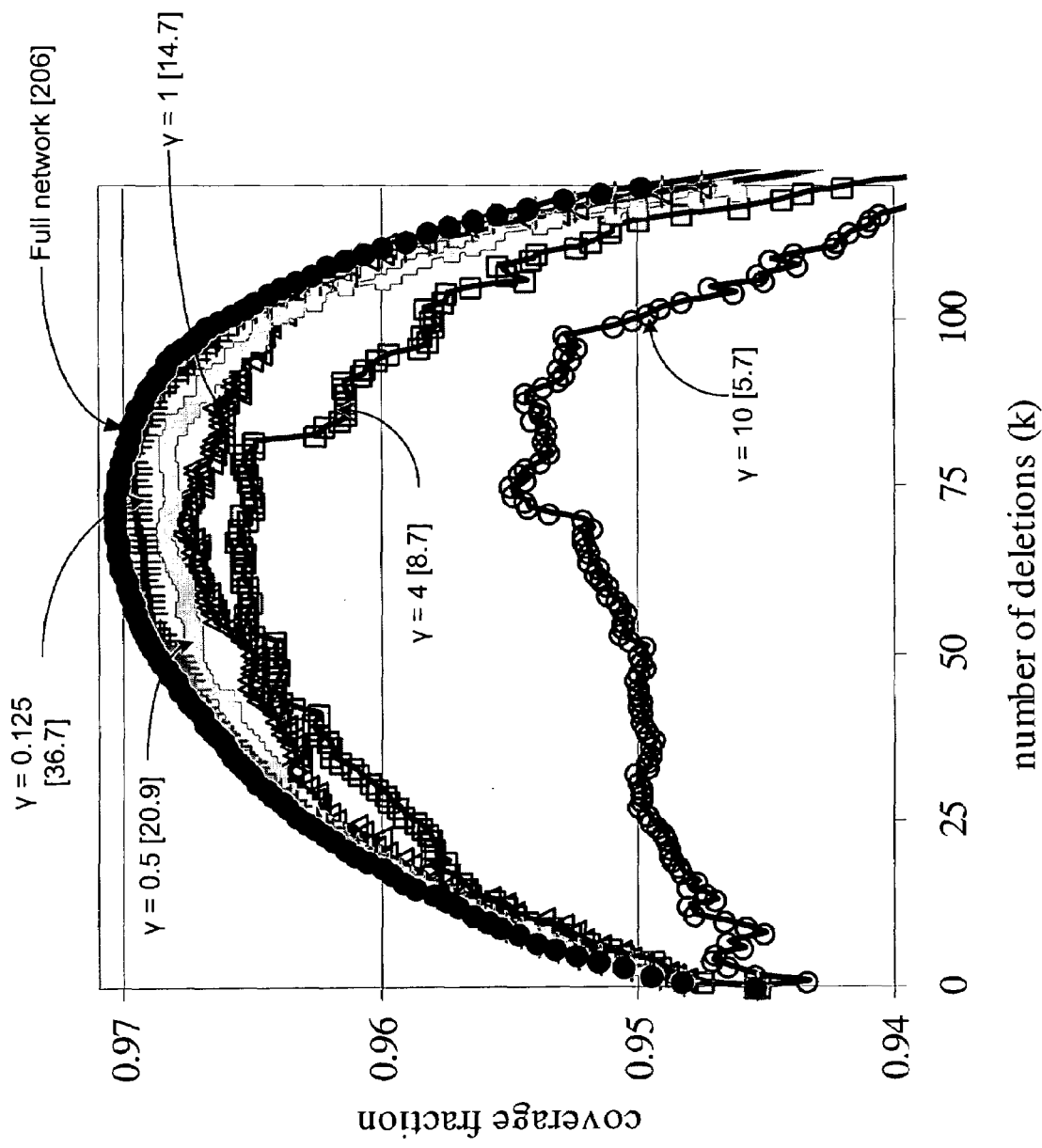
FIGS. 6A and 6B illustrate performance of a variety of different interference mean thresholded neighborhoods on two separate networks as evaluated using the greedy cell deletion algorithm.
Figure 6B:
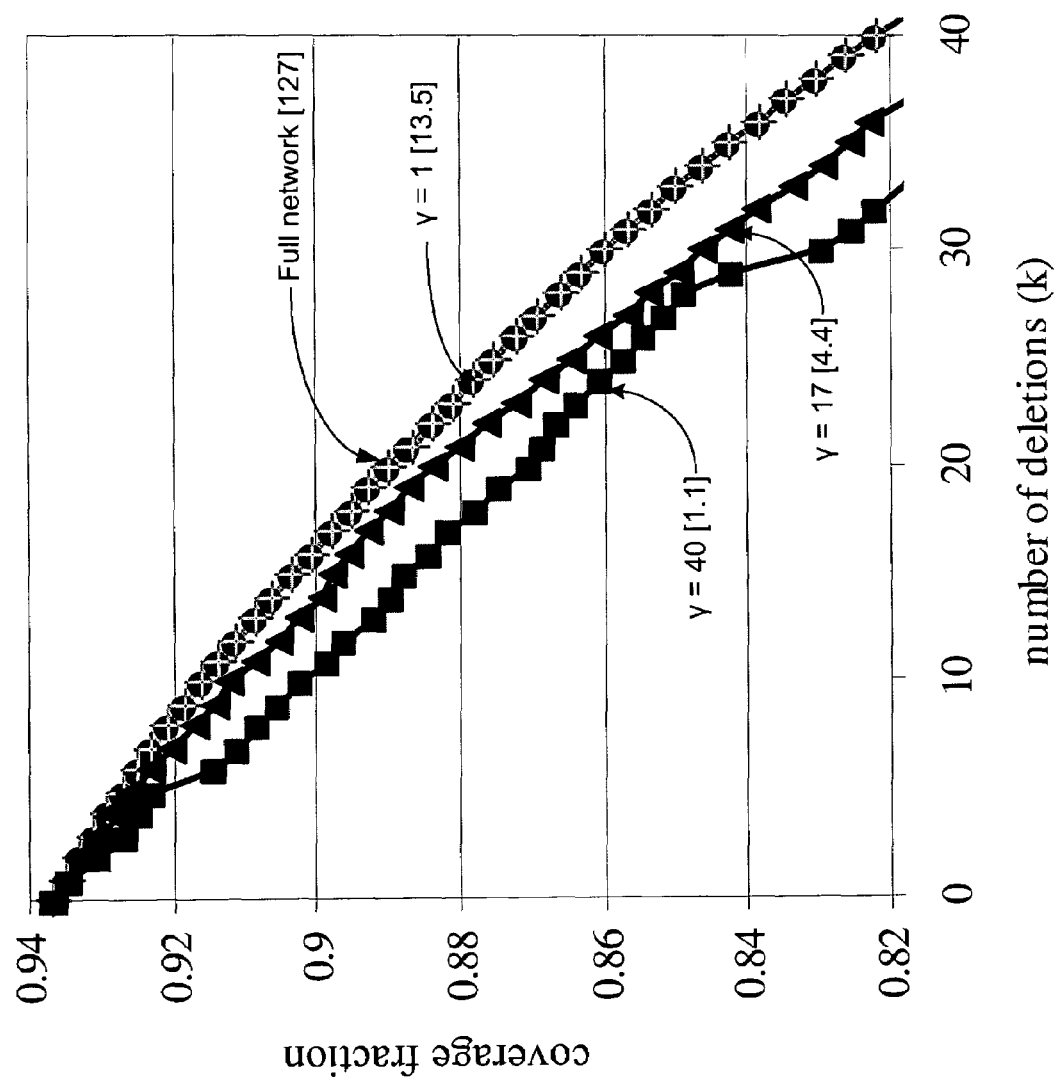

FIGS. 6A and 6B illustrate performance of a variety of different interference mean thresholded neighborhoods on two separate evaluated networks using the greedy cell deletion algorithm.

FIG. 6A illustrates interference mean thresholds on a realistic over-designed 206-cell network. As discussed above, the parameter γ represents a multiple of the linear mean of interference power for each cell. There are six (6) curves shown in FIG. 6A. Referring from top to bottom (where average neighborhood size on the first iteration of the greedy cell deletion algorithm is indicated in brackets), the six curves are shown as: full network evaluation [all 206 cells] (see the "solid circle" curve), γ=0.125 [36.7] (vertical line curve), γ=0.5 [20.9] (solid square curve), γ=1 [14.7] (hollow triangle), γ=4 [8.7] (hollow square) and γ=10 [5.7] (hollow circle).

In FIG. 6A, the γ=0.125 curve closely approximates the full-evaluation curve even though the γ=0.125 average neighborhood size is almost 6 times smaller (206 vs. 36.7 cells). Coverage increases in initial deletions because the network is over-designed and has too many cells. The resulting interference degrades the coverage. As cells are removed the interference decreases and coverage increases. After removing approximately 70 cells, the deletion of cells begins to reduce the overall coverage.

FIG. 6B illustrates interference mean thresholds on a 127-cell, α=0.25 irregular network. There are four (4) curves shown in FIG. 6B. Referring from top to bottom (where average neighborhood size on the first iteration of the greedy cell deletion algorithm is indicated in brackets), the four curves are shown as: full network evaluation [all 127 cells] (solid circle in FIG. 6B), γ=1 [13.5] ("+" curve), γ=17 [4.4] (solid triangle), γ40 [1.1] (solid square). The γ=1 curve is nearly identical to the full-evaluation curve even though the γ=1 neighborhood size is almost nine (9) times smaller (127 vs. 13.5 cells).

FIGS. 6A and 6B illustrate performance of a variety of different interference mean thresholded neighborhoods on two separate evaluated networks using the greedy cell deletion algorithm.

Successful results were obtained for simulated annealing. The inventors generated 14 random states in an α=0.5 irregular network with 25 out of 127 cells deleted. For each state, 500 iterations were run of both conventional-simulated-annealing and locality-simulated-annealing, using an interference mean γ=2. On average, conventional-simulated-annealing improved coverage by 0.0398, while locality-simulated-annealing improved coverage by 0.0387, a difference of only 0.0011. Average neighborhood size in the γ=2 locality-simulated-annealing was 18.8. Thus, locality-simulated-annealing may promise nearly the same coverage with a runtime that is roughly eleven (11) times faster than conventional-simulated-annealing.

FIGS. 7A-7D illustrate correlations between changes in cell coverage (Δcoverage) for a full network evaluation and for a neighborhood evaluation after the first iteration of the greedy cell deletion algorithm.

To gain perspective as to the robustness of the locality approximation and the utility of neighborhoods, in FIGS. 7A-7D the inventors examined the change in coverage (Δcoverage) after the initial deletion of each candidate cell in the same 206-cell realistic network. The Δcoverage was plotted as computed by a full evaluation versus Δcoverage as computed by a neighborhood evaluation, and a correlation coefficient between the two was examined. A high degree of correlations, and subsequently having a correlation coefficient value closer to 1, indicates improved accuracy. The neighborhood size needed to obtain results comparable to full-network simulation does not scale proportionately to network size; instead, it remains roughly constant. Thus, the runtime improvement introduced by locality increases with greater network size.

In FIGS. 7A-7D, charts in the same row (7A and 7B, 7C and 7D) correspond to the same neighborhood method but different neighborhood sizes, while charts in the same column (7A and 7C, 7B and 7D) have approximately the same average neighborhood size but use different thresholding techniques and distance measures to determine the neighborhood. Average neighborhood size on the first iteration, indicated in brackets, increases from left to right. The correlation coefficient, and therefore accuracy of the locality simplification, increases as neighborhood size increases. For fixed neighborhood size, interference mean thresholding has a greater correlation than geographic distance top-X thresholding.

Figure 7A:
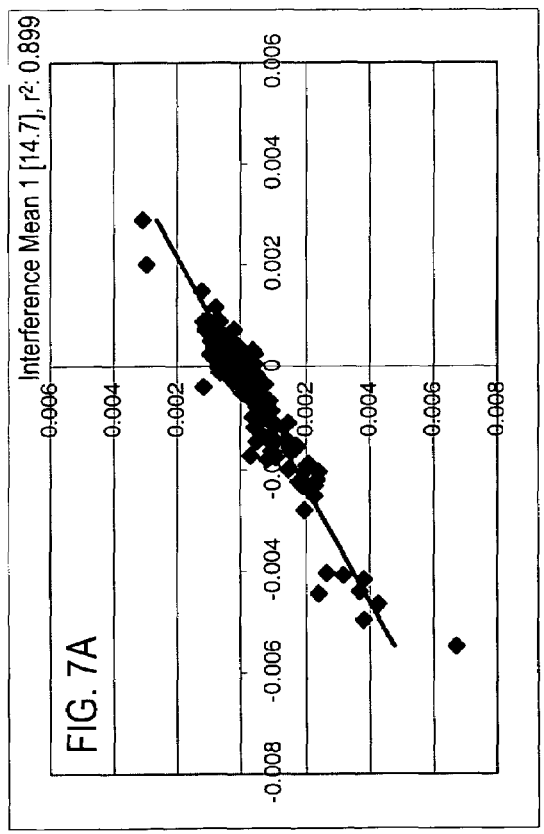
FIGS. 7A-7D illustrate correlations in the change in cell coverage (Δcoverage) based on full network and neighborhood evaluation after the first iteration of an exemplary greedy cell deletion algorithm.
Figure 7B:
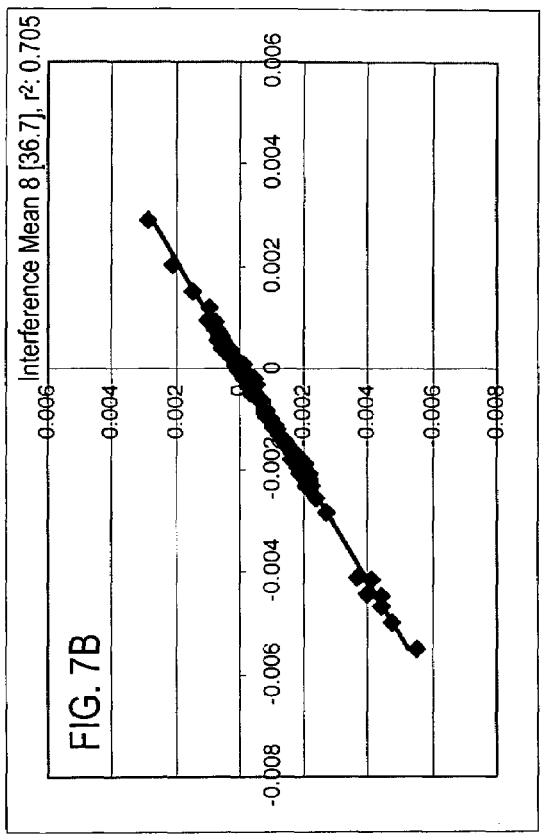
Figure 7C:
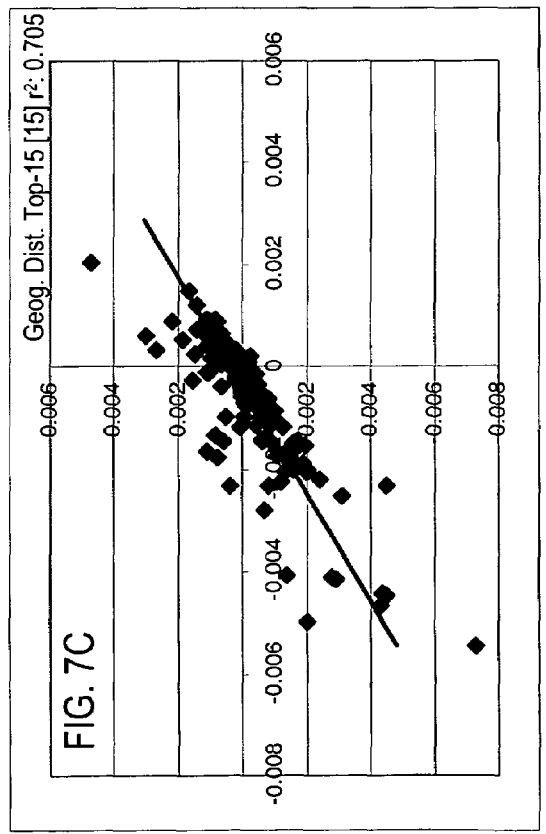
Figure 7D:
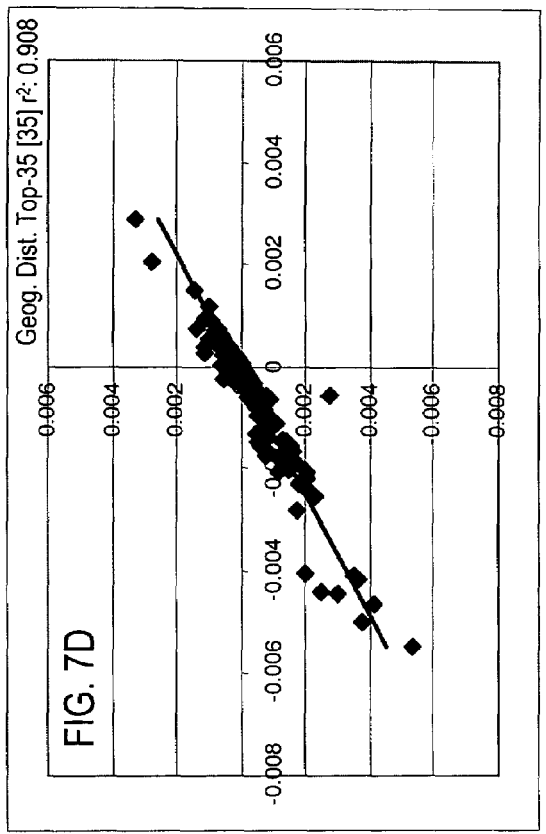

As shown in FIG. 7B, the inventors were able to obtain a near-perfect correlation between the two values when using interference mean thresholding with an average neighborhood size of 36.7, further underscoring the ability of neighborhood simplification to obtain accurate results.

Choice of Distance Measure And Neighborhood Affects Simulation Accuracy

Figure 8:
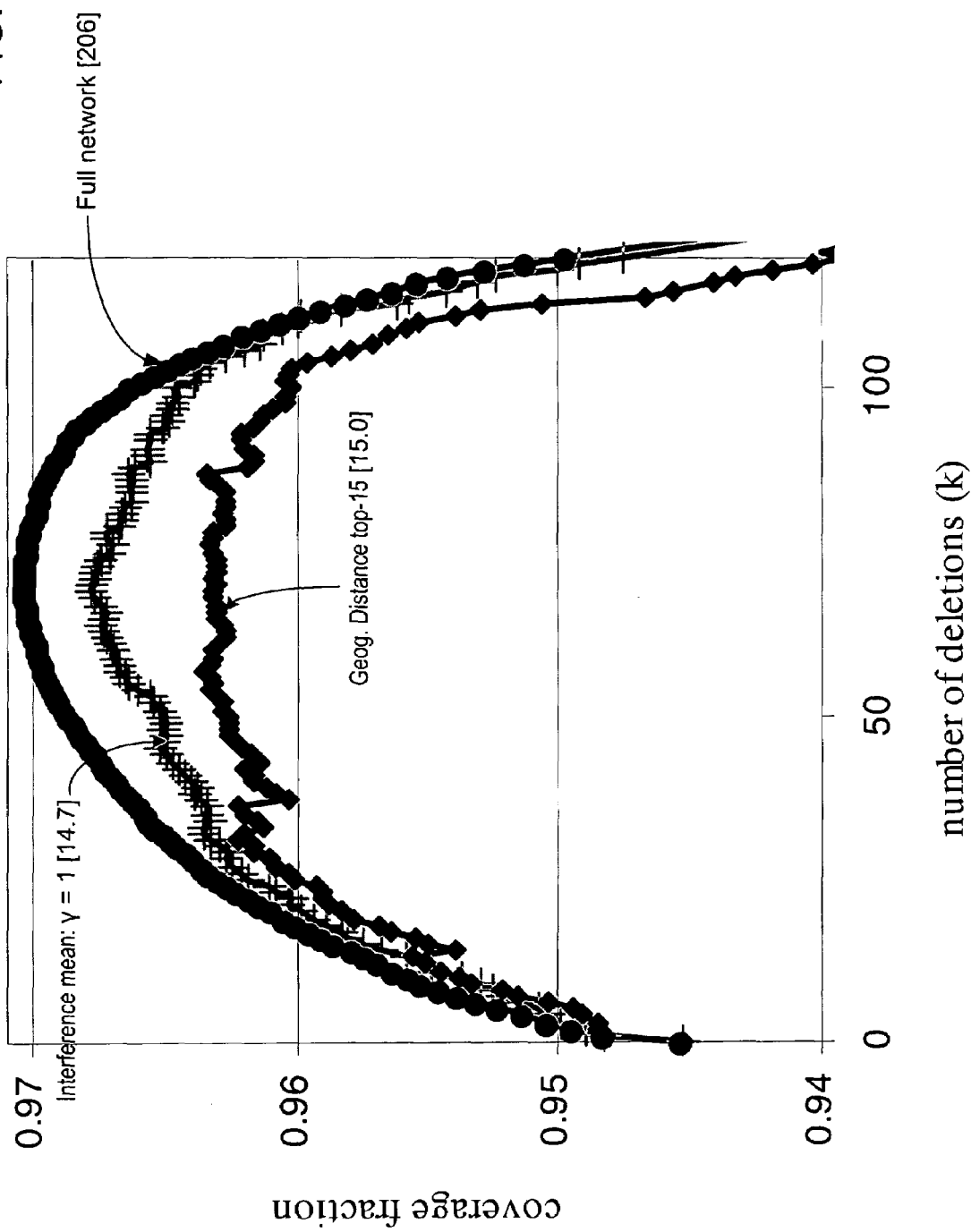
FIG. 8 is a graph illustrating a comparison of the performance of the greedy cell deletion algorithm for neighborhoods determined by Interference mean thresholding versus neighborhoods determined by geographic distance Top-X thresholding.

FIG. 8 is a graph illustrating a comparison of the use of a greedy algorithm with neighborhoods determined by Interference mean thresholding versus neighborhoods determined by geographic distance Top-X thresholding. In FIG. 8, greedy deletion runs on a 206-cell realistic network using different neighborhood definitions. Top to bottom (average neighborhood size on first iteration in brackets): full [206], interference mean .gamma.=1 [14.7], geographic distance top-15 [15]. Even though both neighborhood thresholding definitions have comparable neighborhood sizes (14.7 and 15), the interference mean thresholding algorithm for neighborhood determination performs substantially better because it selects neighbors in a generally more intelligent manner (as suggested by FIGS. 7A-7D).

Accordingly, the choice of distance measure or thresholding can have a significant impact on the performance of the neighborhood simplification. In FIG. 8, and even though both runs had approximately the same average neighborhood size, the interference mean thresholding run showed significantly better results.

In FIGS. 7A-7D, charts in the same row (7A and 7B, 7C and 7D) correspond to the same neighborhood method but different neighborhood sizes, while charts in the same column (7A and 7C, 7B and 7D) have approximately the same average neighborhood size but use different thresholding techniques and distance measures to determine the neighborhood. Average neighborhood size on the first iteration, indicated in brackets, increases from left to right. The correlation coefficient, and therefore accuracy of the locality simplification, increases as neighborhood size increases. For fixed neighborhood size, interference mean thresholding has a greater correlation than geographic distance top-X thresholding.

As shown in FIG. 7B, the inventors were able to obtain a near-perfect correlation between the two values when using interference mean thresholding with an average neighborhood size of 36.7, further underscoring the ability of neighborhood simplification to obtain accurate results.

FIG. 8 is a graph illustrating a comparison of the use of a greedy algorithm with neighborhoods determined by Interference mean thresholding versus neighborhoods determined by geographic distance Top-X thresholding. In FIG. 8, greedy deletion runs on a 206-cell realistic network using different neighborhood definitions. Top to bottom (average neighborhood size on first iteration in brackets): full [206], interference mean .gamma.=1 [14.7], geographic distance top-15 [15]. Even though both neighborhood thresholding definitions have comparable neighborhood sizes (14.7and 15), the interference mean thresholding algorithm for neighborhood determination performs substantially better because it selects neighbors in a generally more intelligent manner (as suggested by FIGS. 7A-7D).

Accordingly, the choice of distance measure or thresholding can have a significant impact on the performance of the neighborhood simplification. In FIG. 8, and even though both runs had approximately the same average neighborhood size, the interference mean thresholding run showed significantly better results.

FIGS. 7A-7D may further illustrate the importance in selecting the thresholding technique for neighborhood determination. In comparing the .DELTA.coverage correlation graphs of similar-sized neighborhoods generated using interference mean thresholding and geographic distance top-X, FIGS. 7A-7D clearly show stronger correlations in the interference mean neighborhoods.

The interference-based method performs better because it generates neighborhoods more intelligently: it is able to include geographically-distant cells that have high interactions with the cell of interest while ignoring geographically-near cells that do not have much interaction. For example, as FIG. 5 shows, cell B is geographically close to A, the cell of interest, but B is also low-traffic and directed away from A. On the other hand, cell C is relatively far away from B, but C has high-traffic and is omni-directional. Interference mean thresholding includes C but not B, while geographic distance top-X includes B but not C-the former is the preferred choice in this situation.

Therefore, the exemplary embodiments of the present invention are directed to methods of simplifying network simulation by using locality-based measures. Although exemplary implementation details and results data has been shown for greedy and simulated-annealing approaches to cell deletion, the methodologies described herein may be applicable to potentially any other network optimization algorithm that requires repeated simulations of given network configurations.

Moreover, a number of optimization algorithms used for evaluation of a wireless communication network may be simplified using the neighborhood concept. Thus, the desired optimization algorithm may be invoked using one or more determined neighborhoods of the network for evaluating network performance. Evaluating cells of a neighborhood in a given iteration instead of all cells in the network may substantially reduce the computational complexities of the optimization by reducing the complexity of the required calculations and/or reducing the number of cells being optimized in a given iteration of the algorithm.

Although some algorithms (such as simulated annealing) may require more evaluations, each iterative evaluation is of a smaller area and therefore less complex and computationally intensive. The net result may be a substantial savings in computational processing time and hardware, since the time required and/or computational complexity of one or more of the processing steps in a given iteration are reduced.

The exemplary embodiments of the present invention being thus described, it will be obvious that the same may be varied in many ways. Such variations are not to be regarded as departure from the spirit and scope of the exemplary embodiments of the present invention, and all such modifications as would be obvious to one skilled in the art are intended to be included within the scope of the following claims.

What is claimed is:

1. A method of simplying simulation of a wireless communication network, comprising:
    dividing the network into one or more neighborhoods, a neighborhood represented by a given cell to be evaluated and one or more neighbor cells of the given cell, each cell having a different radio frequency terminal station, and
    implementing a desired simulation of one or more of the neighborhoods to evaluate network performance at a neighborhood level, wherein the desired simulation is implemented on a neighborhood by neighborhood basis such that each simulation includes the given cell and at least one of the neighbor cells.

2. The method of claim 1, wherein dividing includes defining a neighborhood including the given cell based on reverse link interference information.

3. The method of claim 2, wherein defining includes:
    measuring reverse link interference values at the given cell for mobiles owned by or in communication with another cell, wherein the another cell may or may not be part of the same neighborhood as the given cell to be evaluated, comparing each reverse link interference value to a threshold, and selecting cells whose reverse link interference value exceeds the threshold for the neighborhood of the given cell to be evaluated.

4. The method of claim 3, wherein the threshold is based on a multiple of the linear mean of interference power at the given cell.

5. The method of claim 1, wherein dividing includes defining a neighborhood including the given cell based on path loss information between cells.

6. The method of claim 5, wherein defining includes:

measuring path loss at the given cell from one or more cells, comparing each measured path loss value to a threshold, and selecting cells whose path loss value is below the threshold for the neighborhood of the given cell to be evaluated.

7. The method of claim 1, wherein dividing includes defining a neighborhood for the given cell based on a threshold relating to the geographical distance of other cells from the given cell.

8. The method of claim 7, wherein the threshold is embodied as a set number of cells to be evaluated that are closest to the given cell, the closest cells selected as belonging to the neighborhood to be simulated.

9. The method of claim 8, wherein the value of the set number of cells can be varied based on the structure of the network to be simulated.

10. The method of claim 1, wherein implementing includes iterating at least one of a greedy heuristic-based algorithm and a simulated annealing-based algorithm using one or more of the neighborhoods to determine network performance.

11. The method of claim 1, wherein the desired simulation includes:

selecting a given cell in the network to be evaluated, measuring reverse link interference values at the given cell for the mobiles owned by or in communication with another cell, wherein the another cell may or may not be part of the same neighborhood as the selected cell, comparing the reverse link interference values to a threshold, and selecting cells whose reverse link interference value exceeds the threshold as cells of the neighborhood including the given cell to be evaluated.

12. The method of claim 11, wherein the threshold is based on a multiple of the linear mean of interference power at the given cell.

13. The method of claim 1, wherein the desired simulation includes:

selecting a given cell in the network to be evaluated, measuring path loss between the given cell and one or more points in the vicinity of another cell, comparing each measured path loss value to a threshold, and selecting cells near those points having path loss value less than the threshold as cells of the neighborhood.

14. The method of claim 1, wherein the desired simulation includes:

selecting a given cell in the network to be evaluated, and defining a neighborhood for the given cell based on a threshold relating to the geographical distance of other cells from the given cell.

15. The method of claim 1, wherein at least one radio frequency terminal station is a base station.

16. A method of accelerating the computational processing of an optimization algorithm used for evaluation of a wireless communication network, comprising:

dividing the network into one or more neighborhoods, a neighborhood represented by a given cell to be evaluated and one or more neighbor cells of the given cell, each cell having a different radio frequency terminal station, invoking the optimization algorithm using one or more of the neighborhoods for evaluating network performance to reduce the computational complexities of the optimization by reducing the number of cells to be evaluated in a given evaluation of the network or iteration of the optimization algorithm, and evaluating network performance at a neighborhood level, wherein the optimization algorithm is implemented on a neighborhood by neighborhood basis such that each simulation includes the given cell and at least one of the neighbor cells.

17. The method of claim 16, wherein dividing includes defining a neighborhood including the given cell based on a reverse link interference information.

18. The method of claim 17, wherein defining includes:

measuring reverse link interference values at the given cell for mobiles owned by or in communication with another cell, wherein the another cell may or may not be part of the same neighborhood of the given cell to be evaluated, comparing each reverse link interference value to a threshold, and selecting cells whose reverse link interference value exceeds the threshold for the neighborhood of the given cell to be evaluated.

19. The method of claim 18, wherein the threshold is based on a multiple of the linear mean of interference power due to each mobile owned by or in communication with the another cell.

20. The method of claim 16, wherein the optimization algorithm invoked is at least one of a modified greedy algorithm and a modified simulated annealing algorithm that is iterated on a neighborhood-by-neighborhood basis to determine network performance.

21. A method of assessing quality of a neighborhood of cells determined for a cell of interest, the neighborhood representing a subset of cells of an entire network, the neighborhood and the entire network to be evaluated, the method comprising:

performing one of a simulation and a measurement at the neighborhood level to determine a first parameter, wherein the neighborhood includes a given cell to be evaluated and one or more neighbor cells of the given cell, each cell having a different radio frequency terminal station, performing one of a simulation and a measurement of the entire network to determine a second parameter, the simulation being performed on a neighborhood by neighborhood basis such that each simulation includes the given cell and at least one neighbor cells, and determining a correlation coefficient between the neighborhood and entire network as a function of the first and second parameters, a value of the correlation coefficient indicative of the quality of the neighborhood, as used for the simulation or measurement, as compared to the entire network.

22. A method for simulating performance of a wireless communication network, comprising:
- providing a computational model of a network into a simulator, in which the network is subdivided into cells, and each cell is defined with reference to a particular radiofrequency terminal station;
- selecting at least one cell as a given cell to be evaluated;
- evaluating a distance between each given cell and a plurality of other cells of the network;
- defining one or more other cells as neighbors of the given cell corresponding to the distance;
- dividing the network, in the computational model, into one or more neighborhoods, wherein a neighborhood is represented by a corresponding given cell and one or more neighbor cells of said given cell; and
- implementing, in the simulator, a desired simulation of one or more of the neighborhoods to evaluate network performance at a neighborhood level, wherein the desired simulation is implemented on a neighborhood by neighborhood basis such that each simulation includes the given cell and at least one of the neighbor cells.

* * * * *

UNITED STATES PATENT AND TRADEMARK OFFICE
CERTIFICATE OF CORRECTION

PATENT NO. : 7,639,988 B2
APPLICATION NO. : 11/072439
DATED : December 29, 2009
INVENTOR(S) : Abusch-Magder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 490 days.

Signed and Sealed this

Twenty-first Day of December, 2010

David J. Kappos
*Director of the United States Patent and Trademark Office*